United States Patent Office 3,269,401
Patented August 30, 1966

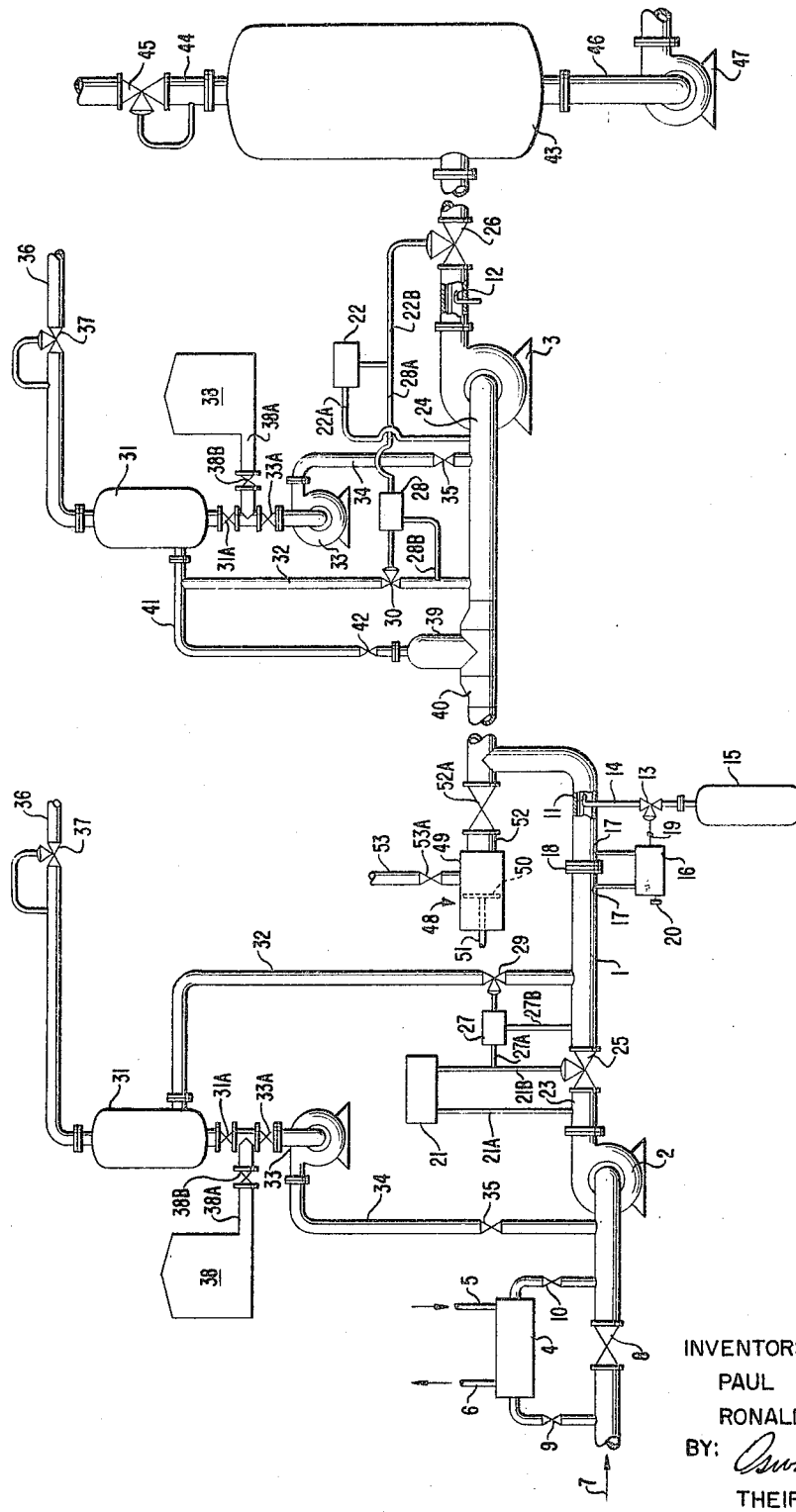

3,269,401
TRANSPORTING WAX-BEARING PETROLEUM FLUIDS IN PIPELINES
Paul R. Scott, Houston, and Ronald F. Scheuerman, Bellaire, Tex., assignors to Shell Oil Company, New York, N.Y., a corporation of Delaware
Filed Aug. 27, 1965, Ser. No. 483,167
9 Claims. (Cl. 137—13)

This invention pertains to a method for pumping wax-bearing oil through pipelines. More particularly, it is concerned with decreasing the viscosity and yield value of the oil and of facilitating start-up of the pipeline after shutdown, especially at low ambient temperatures when there is likelihood of the formation of strong wax structures in the oil. The invention is further concerned with reducing friction losses, thereby lowering pumping costs and pressures. The invention is especially, but not exclusively, concerned with the transportation of highly viscous wax-bearing crude oil.

Wax-bearing oil can be pumped through pipelines with acceptable pumping costs when the wax is not in the form of strong structures. This is the situation when the oil is above its pour point, either above the temperature at which wax precipitates or below said temperature and a few solid wax crystals are present but maintained in separation by virtue of low concentration and shear caused by flow. The oil is often heated at one or more points along the pipeline to reduce viscosity and/or prevent formation of large wax structures. Cooling of the oil to below its pour point does not usually occur during flow because the oil reaches the next heating point before attaining the ambient temperature. However, when the pipeline is shut down for any reason, shear ceases and heat may be transferred to the surroundings; this facilitates combination of wax crystals to form large and strong wax structures, often promoted by the precipitation of fresh wax crystals due to cooling of the oil. These wax structures eventually span the pipeline and impose such a high resistance to flow that it is difficult or impossible to initiate flow until the wax is melted.

Further, such oils, although pumpable, often exhibit undesirably high flow resistance. It is known that viscous liquids can be made to flow more easily through pipes by such expedients as lowering the viscosity by adding diluents or dispersing water therein. Each of these expedients is subject to drawbacks, such as cost, contamination of the oil and the danger of forming water-oil emulsions that must be broken. Moreover, these expedients do not overcome the problem considered in the foregoing paragraph.

Now according to the present invention, the diffculty incident to initiating flow in a pipeline containing wax-bearing oil is overcome by dissolving in the oil at superatmospheric pressure, while above its pour points, and, preferably, while all wax is dissolved therein, a quantity of gas. The quantity of gas dissolved should be more than that required to saturate the oil with gas at atmospheric pressure, but preferably less than that which can be dissolved in the oil under the temperature and pressure prevailing at the gas-injection point whereat the pressure is advantageously superatmospheric, and the oil is flowed through the pipeline at superatmospheric pressure and at a temperature above its pour point, i.e., without solid wax crystals or with only a few, separated wax crystals. Upon cessation of flow, the pressure in the pipeline is lowered below the bubble point, if necessary, by draining some oil from the pipeline, thereby causing gas to separate from the oil as a multitude of small bubbles which become associated with the existing and newly-formed wax crystals, isolating these crystals and inhibiting the formation of a strong wax structure. The mobility of the oil is thereby maintained.

The foregoing inhibiting effect of the gas bubbles is founded on the discovery that gas becomes associated in some way with the wax crystals and prevents the precipitated wax from agglomerating to form strong wax structures. The exact mechanism of this association is not known. It is possible that the gas, at least in part, collects on the surfaces of the wax particles—especially the larger ones—to form films of gas envelopes about the particles thereby forming films or barrier layers which isolate the particles from one another and prevent the wax particles from combining. However, we do not restrict ourselves to any theory regarding the nature of the association of the gas with the wax particles, and it is possible that a true gas-phase envelope about the wax crystals does not occur. Pipeline scrapers can be utilized to prevent wax accumulation on the walls of the pipeline during cooling.

Two additional effects of the gas in the oil may be realized during startup. The first is that the gas bubbles, being compressible, facilitate acceleration of the stationary body of oil in the pipeline. Large forces are required to bring a body of oil within a pipeline—often several miles in length between pumping stations—into motion if all parts of the oil are simultaneously accelerated from a non-flow condition. By providing bubbles throughout the oil there is produced a cushion effect, because the bubbles are compressed and eventually disappear by being dissolved in the oil upon a rise in pressure. This permits successive parts of the oil, starting with the upstream portion near a line pump, to be accelerated in succession and facilitates initiation of flow with reasonable pump pressures. Moreover, once the oil starts to move, such wax structures as may have formed are broken up by turbulence or shear; the oil then becomes more mobile. In fact, tests have shown that even a small movement of waxy oil below its pour point greatly reduces the yield from what it was in non-flowing oil; in some experiments the yield point was lowered to one-hundredth of its initial value.

The second added effect, sometimes realized, is that lowering of the pressure upon shutdown and the consequent formation of expanding gas bubbles breaks up wax structures that may have formed or are being formed. This leads to a wax structure that is weaker and less effective to immobilize the oil within the pipeline than would have occurred without the expanding bubbles. Hence, subsequent startup is made easier.

Finally, in addition to facilitating initiation of flow, the presence of the gas in the oil reduces its flow resistance, thereby leading to reduced pumping costs and increased throughputs.

Any gas may be used, and it is preferred to use one having only a limited solubility in the oil. The term "gas" is used herein to include vapor. A preferred gas is essentially a member of the class consisting of nitrogen, carbon dioxide, flue gas, hydrocarbons having less than three carbon atoms, such as natural gas, and mixtures of any or all of these gases may be used. The flue gas may be obtained by burning a part of the oil in the pipeline.

The minimum amount of gas to be dissolved is determined by the requirement that bubbles should form when the pressure is reduced to below operating pressure upon shut-down of the pipeline, preferably to provide bubbles having a total volume of from 1–10% of that of the oil. The maximum amount is preferably that which can be dissolved in the oil at the highest pressure which prevails in the pipeline, i.e., just downstream of the line pump of the pumping station whereat the gas injection occurs. However, it is not an absolute requirement that all of the gas be dissolved, and some bubbles, up to 8%, usually between 0.1–5% by volume of the oil, may be present within some or all parts of the pipeline.

In the event that the presure within the pipeline is reduced, as upon shutdown, and bubbles form which are not wholly re-dissolved upon startup, as well as when the amount of injected gas exceeds its solubility at least near the downstream end of a section of pipe—just upstream from the next pumping station—it may be desirable to remove such gas to ensure effective operation of the pump. To this end, the oil, or a part of the oil, may be discharged from the pipeline, flowed through a separator wherein free gas is removed, and the residual liquid may then be returned to the pipeline.

The invention will be further described with reference to the accompanying drawing forming a part of this specification, the single view of which is a diagrammatic elevation view of a part of a pipeline, parts being shown in section.

Referring to the drawing, there is shown a part of a pipeline 1 between line pumps 2 and 3 which may be located at predetermined intervals along the line, e.g., several miles apart. These are usually centrifugal pumps, driven by suitable electrical motors, not shown. The pressure at the discharge side of each pump is typically between 1,000 and 3,000 p.s.i.g., and controlled so that there is a positive pressure at each pump intake. Although usually not necessary, there may optionally be provided heating means disposed as desired along the pipeline, and one such unit is shown at 4 in the form of a heat exchanger to which a thermal stream such as steam is flowed through lines 5 and 6. The waxy crude is admitted at 7 and is directed by suitable valves 8, 9 and 10, either to the heat exchanger or either in part or wholly through the valve 8.

Gas injection devices of any suitable design, such as nozzles 11 and 12, are provided, preferably at the downstream sides of the pumps. However, any other mechanical arrangement for sparging a gas into the waxy oil may be used. For example, slits or ports in the pipe wall, as shown in U.S. 2,821,205, may be used. Each gas injection device is provided with suitable means for controlling the rate of gas flow. This may include a flow control valve 13 connected in a pipe 14 leading from a source of gas under pressure, represented by a tank 15, and a controller 16 for the valve. This controller is, in this illustrative embodiment, shown to act responsively to the metered oil flow rate, e.g., on the differential pressure between pressure taps 17 in the main pipeline on opposite sides of an orifice plate 18, and the output signal is transmitted to the valve 13 through a duct 19, whereby the gas injection rate is maintained proportional to the oil flow rate. The proportionality factor may be adjusted by adjusting the set point of the controller by a control knob 20.

The pipeline system may include some means for reducing the pressure within the pipeline upon shutdown. Since the pressure drop through the line disappears upon cessation of flow, the pressure often rises at the downstream end. When discharge through a downstream pump, or through a by-pass line around the pump is not possible, the pressure is, in one embodiment, reduced by bleeding off a small amount of the oil-gas blend. A special pressure-reducing system is provided comprising pressure responsive devices 21 and 22 which respond to reduction in pressure within the pipeline through pressure ducts 21a and 22a at their respective measuring points 23 and 24 by emitting signals through ducts 21b and 22b to the operators of main pipeline valves 25 and 26 to close the latter. Control devices 27 and 28 which control pipeline pressure relief valves 29 and 30, respectively, are time delay devices which are actuated by the valve-operating signals generated by pressure responsive devices 21 and 22 when the pressure within the main pipeline is above a preset value. For this purpose, control devices 27 and 28 are connected to signal generating ducts 21b and 22b through signal detecting ducts 27a and 28a respectively; and to appropriate pressure measuring points within the main pipeline through pressure ducts 27b and 28b, respectively. Time controlled relief valves 29 and 30 control the flow of fluid to gas separators 31 to which the oil-gas blend that is removed from the main pipeline to reduce the pressure therein is sent via inlet pipes 32. Valves 31a are located at the oil discharge end of separators 31 and control the flow of oil therefrom. Pumps 33 are located in the oil discharge lines of separators 31, the flow therethrough being controlled by valves 33a located at the suction side thereof. Pipelines 34 with valves 35 therein are connected to the discharge sides of pumps 33 and can return the oil to the main pipeline, if desired. Gas is removed from the separators 31 via pipes 36 through pressure reducing valves 37. To provide for an excess of oil from the separators 31 that cannot be taken directly back into the main pipeline, there is optionally provided oil storage tanks 38 connected to the oil discharge lines of the separators 31 between valves 31a and 33a via pipes 38a having valves 38b therein. With this construction, the oil from the separators can be pumped directly back to the main pipeline by opening valves 31a and 33a and closing valves 38b; oil from the storage tanks can be pumped to the main pipeline by opening valves 33a and 38b and closing valves 31a; or oil from the separators can be simply discharged from the separators to the storage tanks by opening valves 31a and 38b and closing valves 33a.

For removing undissolved gas from the oil, there may be provided, just upstream from each downstream pump, a gas removal means connected to a separator 31 which comprises a dome 39 rising from an eccentric enlarged pipe section 40 of main pipeline 1 and connecting with a separator through a gas inlet pipe 41 having a valve 42 therein.

To prevent a buildup of wax on the walls of the pipeline, pipeline scrapers of any well-known type can be used. Scrapers might be particularly desirable in those sections of the pipeline wherein the oil temperature decreases from the higher initial temperature to ambient pipeline temperature. One satisfactory arrangement (not shown) is to use scraping spheres which can be launched into the pipeline at any desired location for cleaning a portion thereof and then removed through a sphere receiver after traveling through the line where the oil is cooling to ambient pipeline temperature. This is only one type of scraper and there are many forms of pipeline scrapers available which would work satisfactorily.

To facilitate startup operations for the pipeline after an extended idle time and a decrease in temperature of the blend, there may be provided a pulsating pressure means to apply pressure to the line. Such a varying pressure may be applied by a pulse generating device 48 comprising a cylinder 49 containing a reciprocable piston 50 that has its piston rod 51 connected to a suitable driving power device. The cylinder is connected to the pipeline via a branch pipe 52 having a normally closed valve 52a and is further connected to a reservoir of a Newtonian liquid by a pipe 53 normally closed by a valve 53a therein.

One exemplary mode of operation will now be described. Wax-bearing oil admitted at 7 from storage is introduced to the suction of the initial pump 2 at a temperature above its pour point, being heated, if necessary, in the heat exchanger 4. The pump increases the pressure to a minimum preset value, say 400 p.s.i.g. The control device 21 senses the increased pressure and opens valve 25 and keeps it open as long as the discharge pressure is 400 p.s.i.g. or greater. Valve 29 is simultaneously closed. Flow through the orifice plate 18 causes a pressure differential sensed by control device 16 for the gas injection valve 13. The gas injection valve is positioned by this control device to inject gas into the pipeline 1 through nozzle 11 at a rate sufficient to produce a blend with a constant gas-to-oil ratio. In this example, sufficient gas is injected to raise the bubble point of the mixture to 375 p.s.i.g. The flow of the blend increases the pressure in the pipeline and thus the pressure at the suction of an intermediate station pump 3. When this suction pressure reaches a predetermined value, again say 400 p.s.i.g., control device 22 opens the valve 26 in the main pipeline on the discharge side of pump 3. This action or another action may be used to activate pump 3. The valve 30 is simultaneously closed. Valve 26 is positioned by the control device 22 to keep the discharge from pump 3 at a rate to maintain the suction pressure at a minimum of 400 p.s.i.g. The wax-bearing oil-gas blend then flows to another station pump or to the end of the pipeline where a large gas separator 43 separates the gas from the waxy oil. The gas is discharged from the separator 43 via pipe 44 through a pressure reduction valve 45. The oil is transported to storage or point of utilization through pipe 46 and pump 47.

One possible sequence of events upon pipeline shutdown will now be described. When the pressure on the discharge side of pump 2 decreases to a value below 400 p.s.i.g., e.g., because of power failure or shut-down, the control device 21 closes valve 25, the pressure drop being detected through pressure duct 21a and the valve closing signal being transmitted through duct 21b. The signal in duct 21b also acts on the time delay device 27 through duct 27a and activates it. After a predetermined time delay, e.g., 2 to 30 minutes (after valve 25 is completely closed), relief valve 29 is opened to reduce the line pressure. Relief valve 29 is opened by device 27 when the pipeline pressure detected through duct 27b is greater than 350 p.s.i.g., but remains closed when the pressure is lower. Valve 29 is then closed automatically upon startup when the opening of valve 25 is detected by control device 27. A delay in activating relief valve 29 is desirable to prevent premature opening due to pressure fluctuations or momentary losses of power to the pump. The oil-gas blend is bled into the gas separator 31 until the pressure at this point in the pipeline reaches some predetermined value which is below the bubble point of the blend, say 350 p.s.i.g.

Soon after flow at initial pump 2 ceases, the suction pressure at pump 3 decreases to below 400 p.s.i.g. Repeating the control pattern initiated by control device 21, control device 22 then closes the back pressure regulator valve 26. The time delay device 28 is thereby actuated. When the preset time has elapsed (2–30 minutes), the pipeline pressure regulating valve 30 is opened; and the oil-gas blend is bled to a gas separator 31 until the pressure in the pipeline 1 reaches a value of 350 p.s.i.g. After valve 30 has been in operation sufficiently long to relieve the line pressure below the bubble point, 5–30 minutes, the time delay device causes the valve to close and remain closed until valve 26 has opened and closed again, the opening of valve 30 being triggered only by the closing of valve 26. Valve 30 must remain closed until the next shutdown to prevent discharge of fluid when pump 3 is re-started.

Reducing the pressure in the main line allows the oil-gas blend to become supersaturated and gas vapor bubbles to form. If the blend cools, the pressure in the line is further reduced because of the decreased volume, allowing the oil to remain at or near supersaturation regardless of the temperature. Wax which is precipitated while the oil is supersaturated with gas does not form a strong structure which would result in a high yield strength and there would be less chance of plugging the pipeline.

One possible startup procedure for the pipeline described above, after an extended idle time and a decrease in temperature of the blend, would be as follows. Wax-bearing oil from storage, in a fluid state, is introduced into the suction of initial pump 2. When the pressure at discharge exceeds 400 p.s.i.g., valve 25 opens and valve 29 closes. The pressure is increased to 70 percent of the normal operating pump discharge pressure. Valve 53a is opened and a Newtonian liquid is admitted into the chamber 49 through the line 53 from a reservoir and an auxiliary pump (neither shown). The valve 53a is then closed and valve 52a opened. Piston 50 is then actuated by a pulse generator (not shown) at a predetermined frequency. High energy pulse waves sent down the pipeline facilitate breakup of the wax structure, reduce the pressure required to initiate flow and reduce the time to reach normal pipeline flow rates. As a further help, the gas bubbles act as a cushion, facilitating initiation of flow. When flow is initiated, the valve 52a is closed.

Some of the gas liberated due to lowering the pressure will not go back into solution before the blend reaches the suction of pump 3. Large bubbles of gas may be removed at the gas eliminator comprising a dome 39, an enlarged pipe section 40, a separator 31 and the discharge system associated therewith.

When the pressure at the suction of pump 3 increases to 400 p.s.i.g., the pump is activated and valve 26 opens. The maximum allowable pressure is again applied by pump 3 and a pulse generating device activated, and so on, until the entire line is started.

The pipeline structure described can be modified in the event wax deposition and formation of a rigid structure as the oil cools results in excessive pressures required to maintain flow. One possibility is to make the initial portion of the pipeline of diameter sufficiently larger than in the first embodiment to permit the oil to flow at the desired flow rate at a pressure below the bubble point (free gas bubbles present) of the oil. This large-diameter section of the line would be of sufficient length (e.g., several miles) that the oil would be reduced to average pipeline temperature while traveling therein. The undissolved, expanding bubbles (due to the natural pressure drop in a flowing line) would break up and prevent reforming of a rigid structure as the oil cools by dissipation of heat to the surrounding ground. Once cooled, the oil would continue to be pumped at higher main line pressures through a smaller diameter main pipeline. Another possibility is providing a portion of pipeline within which the oil temperature can be lowered to ambient pipeline temperature with a minimum of rigid wax buildup. A convenient embodiment is to use a buried cooling pipe loop of sufficient length to cool the oil to ambient pipeline temperature before it is fed to the main pipeline from the cooling loop. Scraping means, such as ball-type pigs, would be desirable in the cooling sections or loops to prevent wax accumulation on the pipe walls. The operation of these modified pipelines would be quite similar to the pipeline shown in the drawing, being the same once the oil has cooled to pipeline temperature.

It is evident that the method is subject to variations in the details described above for the preferred embodiment. For example, although the invention involves dissolving gas at a pressure above atmospheric, the actual injection of the gas may be effected at a lower pressure, followed by the application of pressure to the oil, e.g., by flow through a line pump.

We claim as our invention:

1. The method of transporting an oil which contains undissolved wax at ambient pipeline temperature and preventing buildup of strong wax structures in the pipeline which comprises the steps of:
    (a) dissolving in said oil while above its pour point temperature and at superatmospheric pressure, gas in an amount in excess of that which saturates the oil at atmospheric pressure; and
    (b) flowing the resulting solution at superatmospheric pressure through said pipeline whereby some of said dissolved gas separates to form gas bubbles within said oil as it cools to ambient temperature within the pipeline to prevent the formation of strong wax structures in said oil upon such cooling.

2. Method as defined in claim 1 wherein said gas is dissolved in the oil at a temperature at which substantially all wax is dissolved in the oil.

3. Method as defined in claim 1 wherein all of the gas is dissolved in the oil when said oil is above its pour point temperature.

4. Method as defined in claim 1 wherein the amount of gas is from 0.1 to 8% by volume in excess of its solubility in the oil, such that the oil contains free gas bubbles.

5. Method as defined in claim 1 wherein said gas is selected from the group consisting of nitrogen, carbon dioxide, flue gas, hydrocarbons having less than three carbon atoms and mixtures thereof.

6. In combination with the method as defined in claim 1, the further step of scraping the walls of the pipeline to prevent an accumulation of wax in that portion of the pipeline wherein the oil is cooling to pipeline temperature.

7. The method of transporting an oil which contains undissolved wax at ambient pipeline temperature through a pipeline and preventing buildup of strong wax structures in the pipeline upon shutdown of the line, comprising the steps of:
 (a) dissolving in said oil, while above its pour point temperature and at superatmospheric pressure, gas in an amount in excess of that which saturates the oil at atmospheric pressure;
 (b) flowing the resulting blend at superatmospheric pressure through open valves within said pipeline;
 (c) detecting pressure reductions below a predetermined minimum which denote a shutdown to close the valves within said pipeline;
 (d) removing some of said blend after detection of a shutdown to further reduce the pressure to ensure that some of the dissolved gas separates to form free gas bubbles within the oil;
 (e) opening valves after shutdown is over for resumption of a continuous flow through said pipeline; and
 (f) scraping the walls of the pipeline to prevent an accumulation of wax during cooling.

8. Method as defined in claim 7 wherein the amount of gas supplied to the oil is from 0.1 to 8% by volume in excess of its solubility in the oil, such that the oil contains free gas bubbles.

9. A method for providing starting-up procedure for pipelines transporting an oil containing undissolved wax at ambient pipeline temperature comprising:
 (a) dissolving in said oil while above its pour point temperature and at superatmospheric pressure, gas in an amount in excess of that which saturates the oil at atmospheric pressure;
 (b) flowing the resulting blend at superatmospheric pressure through the pipeline;
 (c) reducing the pressure in the pipeline after shutdown to below the superatmospheric operating pressure to ensure free gas bubbles;
 (d) applying a series of pressure pulses to the blend in the pipeline to initiate flow after the shutdown is over; and
 (e) resuming normal flow at superatmospheric pressure through said pipeline.

References Cited by the Examiner
UNITED STATES PATENTS

| | | | |
|---|---|---|---|
| 1,007,788 | 11/1911 | Mills | 137—13 |
| 1,454,485 | 5/1923 | Persch | 137—13 |
| 3,143,124 | 8/1964 | Todd | 137—13 |

MARTIN P. SCHWADRON, *Primary Examiner.*

A. COHAN, *Examiner.*